(12) United States Patent
Pasquini

(10) Patent No.: US 8,046,876 B2
(45) Date of Patent: Nov. 1, 2011

(54) COOKWARE HANDLE WITH COMPRESSIBLE GRIP

(75) Inventor: Ludovic Pasquini, Annecy (FR)

(73) Assignee: SEB S.A., Ecully (FR)

( * ) Notice: Subject to any disclaimer, the term of this patent is extended or adjusted under 35 U.S.C. 154(b) by 268 days.

(21) Appl. No.: 12/235,675

(22) Filed: Sep. 23, 2008

(65) Prior Publication Data
US 2009/0083944 A1 Apr. 2, 2009

(30) Foreign Application Priority Data

Sep. 27, 2007 (FR) .................................. 07 06772

(51) Int. Cl.
*B25G 1/10* (2006.01)
(52) U.S. Cl. .............................. 16/436; 16/430; 220/753
(58) Field of Classification Search .................... 16/430, 16/431, 435, 436, 421, DIG. 12, 110.1; 220/753, 220/573.1, 755; 81/489
See application file for complete search history.

(56) References Cited

U.S. PATENT DOCUMENTS

| 3,072,955 A * | 1/1963 | Mitchell ........................ 294/171 |
| 5,586,682 A | 12/1996 | Yeh |
| 5,867,867 A | 2/1999 | Kessler |
| 5,926,912 A | 7/1999 | Claphan |
| 6,170,694 B1 | 1/2001 | Munari |
| 6,725,505 B2 * | 4/2004 | Willat ............................. 16/430 |
| 7,490,732 B2 * | 2/2009 | Wasserman et al. .......... 220/753 |
| 2005/0189360 A1 | 9/2005 | Loucks et al. |
| 2007/0017066 A1 * | 1/2007 | Chen et al. ...................... 16/421 |
| 2008/0290104 A1 * | 11/2008 | Ng et al. ......................... 220/753 |

FOREIGN PATENT DOCUMENTS

| DE | 597085 C | 5/1934 |
| EP | 1704804 A | 9/2006 |

* cited by examiner

*Primary Examiner* — William L. Miller
(74) *Attorney, Agent, or Firm* — The Webb Law Firm

(57) ABSTRACT

A cookware handle designed to be grasped by a user's hand, consisting of a rigid structure attached to the cookware, and a flexible grip surrounding the rigid structure. The flexible grip has at least one part consisting of a wall that is from 2 to 10 mm thick, and preferably 5 mm thick, that creates a hand support surface, and at least one hollow cavity inside the grip is adjacent to the wall to enable said wall to be compressed when the handle is grasped.

7 Claims, 2 Drawing Sheets

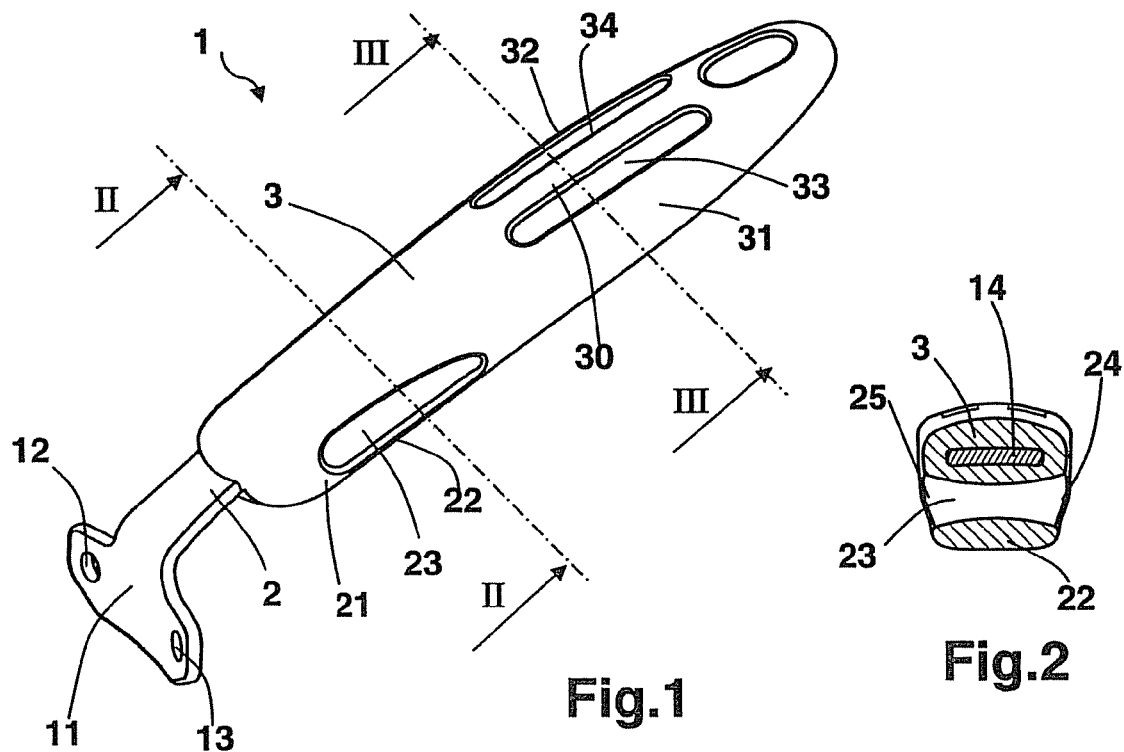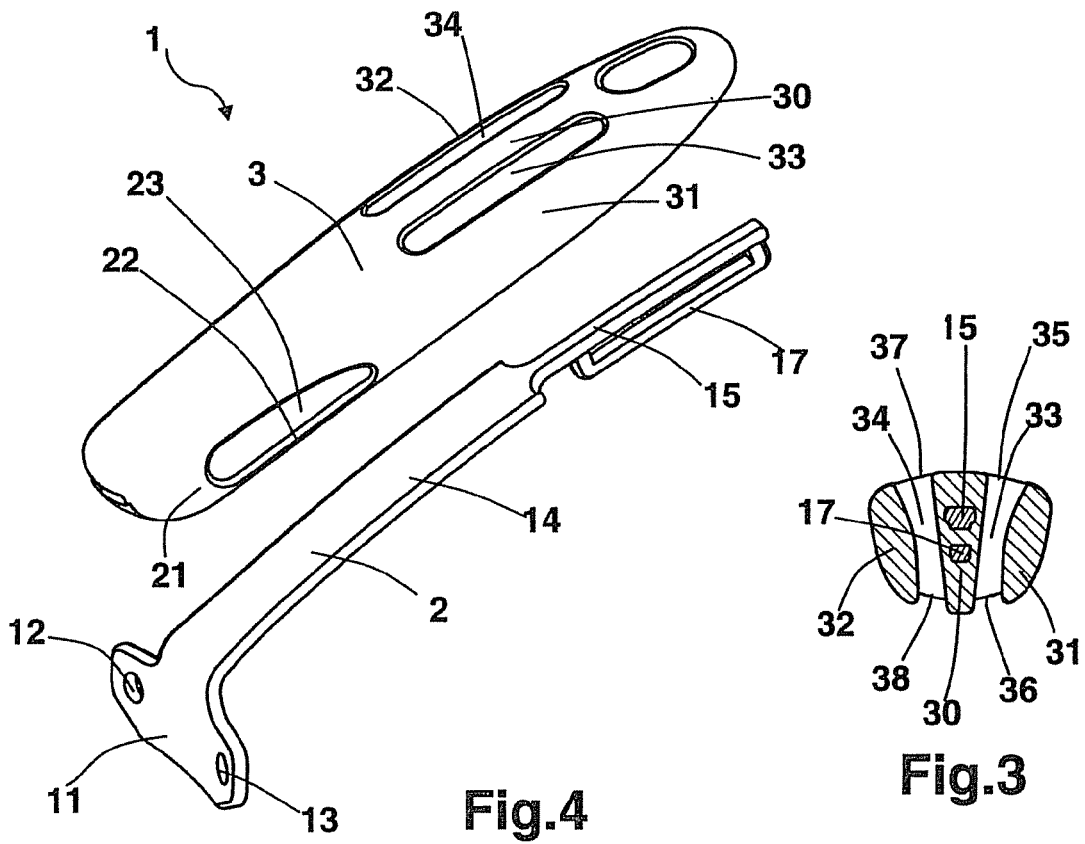

COOKWARE HANDLE WITH COMPRESSIBLE GRIP

BACKGROUND OF THE INVENTION

1. Field of the Invention

This invention pertains to a handle for cookware such as a saucepan or frying pan.

2. Description of Related Art

In prior art, and specifically in Document EP 1704804, we have seen a handle with a rigid structure and a grip surrounding the structure. The grip is made of a material that conducts heat less than the material of which the structure is made and has an ergonomic shape that makes the handle easy to hold. However, this construction does not make it possible to compress the grip so that its shape conforms to the shape of the user's hand when the handle is grasped and manipulated.

The objective of this invention is to offer a solution for the aforementioned disadvantages and to provide a cookware handle with optimal ergonomics, in which the shape of the grip can conform to the shape of the user's hand.

Another object of the invention is to provide a cookware handle that makes it possible to manipulate said cookware in a completely safe manner by limiting the temperature of the grip and by ensuring that the handle will be held securely in the user's hand.

Another objective of the invention is to provide a cookware handle with a simple design that is inexpensive to implement.

SUMMARY OF THE INVENTION

All of these objects are met by a cookware handle consisting of a rigid structure attached to the cookware and a flexible grip that surrounds the rigid structure, that is designed to be grasped by a user's hand due to the fact that the flexible grip has at least one part consisting of a wall that is between 2 and 10 millimeters thick, and preferably 5 millimeters thick, that creates the hand support surface, and at least one hollow cavity inside the grip and adjacent to the wall, so that said wall can be compressed when the handle is grasped.

The term "hand support surface" refers to the area of the handle on which the hand exerts pressure, including the thumb, palm and fingers.

When the handle is grasped by the user's hand, the wall of the grip is compressed into the cavity. This pressure causes the shape of the handle to conform to the shape of the hand, which improves the user's grasp on the handle.

The cavity is preferably positioned between the wall and the rigid structure.

This feature allows the wall to be compressed into the cavity without reaching the rigid structure and without the rigid structure interfering with the compression.

Preferably, the cavity is between 2 and 10 millimeters deep and preferably 5 millimeters deep.

This feature allows the wall of the grip to be compressed anywhere from 2 to 10 millimeters, so that the shape of the handle conforms well to the shape of the hand.

One advantage is that the cavity is open.

This feature facilitates the compression of the wall and also makes it easier to manufacture the handle.

Another advantage of this feature is that when cooking food in the cookware, it dissipates the heat conducted by the structure to the grip through the openings in the cavity, thus limiting the temperature of the handle and improving the user's safety and comfort.

Preferably, the grip is manufactured by being cast molded onto the rigid structure.

This feature makes it possible to manufacture the grip simply and economically. In addition, the cast molding technique can be used to obtain an ergonomic shape for the grip.

The grip is preferably made of a heat-resistant silicone material.

This feature keeps the temperature of the grip low and comfortable for the user. Other materials such as elastomers or foam could also be considered.

Another advantage is that the shore hardness of the grip is between 60 and 80 shores, and preferably 70 shores.

This feature makes the grip flexible and soft to the touch, thus making it very comfortable to use.

The grip preferably has a lower front part, consisting of the wall and the hollow cavity adjacent to said wall.

This feature creates a compressible area facing the support for the index finger of the hand on the grip. When the user lifts the cookware, such as a frying pan, that is heavy with the food being prepared, the inertia of this ensemble causes the handle to press against the index finger. The compression of the wall facing the index finger then absorbs part of the impact and decreases the user's exertion.

The grip also offers the advantage of having a back part consisting of two lateral walls and two hollow cavities that are adjacent to said walls.

This feature creates a compressible area located between the palm of the hand and the middle and little fingers.

BRIEF DESCRIPTION OF THE DRAWINGS

The invention will be more clearly described in reference to specific examples of implementation that in no way limit the scope of the invention, illustrated in the figures in the appendix, in which:

FIG. 1 depicts a perspective view of a cookware handle according to one presently preferred embodiment of the invention;

FIG. 2 depicts a cross section along the line II-II of the handle in FIG. 1;

FIG. 3 depicts a cross section along the line III-III of the handle in FIG. 1;

FIG. 4 depicts an exploded view, in perspective, of the handle in FIG. 1;

DETAILED DESCRIPTION OF THE INVENTION

Figure 5:
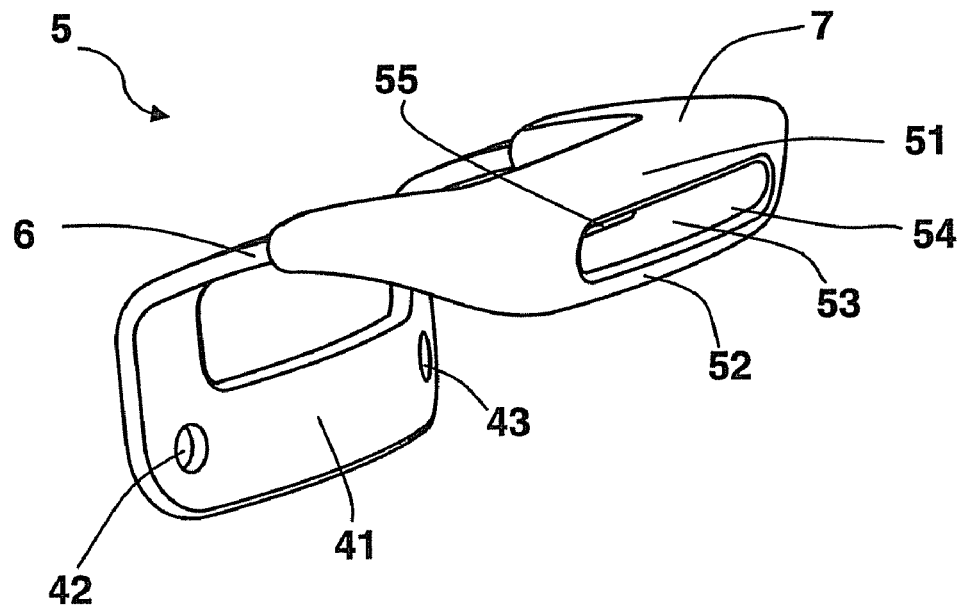
FIG. 5 depicts a perspective view of another presently preferred embodiment of a cookware handle according to the invention.

As depicted in FIGS. 1 to 4, the cookware handle 1 consists of a rigid structure 2 and a grip 3 surrounding the rigid structure 2.

The rigid structure 2 consists of a front part 11 designed to be placed against the curved edge of the cookware (not shown). The front part 11 has a means of being attached to the curved edge, such as two openings 12, 13 that can accommodate two rivets.

From the front part 11, there is a rigid structure 2 consisting of a shaft 14 with a cross section that is roughly rectangular in shape, extending lengthwise. The shaft 14 consists of a thinner back part 15 that is reinforced by an arch 17 positioned underneath this back part 15.

The grip 3 is cast molded onto the shaft 14 of the rigid structure 2, giving said grip 3 an ergonomic shape designed to be grasped by the user's hand. The grip 3 is made of a flexible silicone material.

The grip 3 has a lower front part 21 consisting of a wall 22 positioned roughly horizontally and facing the index finger of the user's hand when the handle 1 is grasped.

A hollow cavity 23 is adjacent to the wall 22 and extends lengthwise to allow said wall 22 to be compressed when the handle 1 is grasped. The cavity 23 exists in the material of the grip 3, between the wall 22 and the shaft 14 of the rigid structure 2, and it has two lateral openings 24, 25 (FIG. 2).

The grip 3 has a back part 30 with two lateral walls 31, 32 positioned roughly vertically facing the palm and the ring and little fingers of the user's hand when the handle 1 is grasped.

Two hollow cavities 33, 34 are adjacent to the two walls 31, 32 and extend lengthwise to allow the walls 31, 32 to be compressed when the handle 1 is grasped. The cavities 33, 34 are positioned in the material of the grip 3, between the walls 31, 32 and the thinner back part 15 of the rigid structure 2, and they each have two lateral openings 35, 36 and 37, 38 (FIG. 3).

When the handle 1 is grasped and manipulated, the walls 22, 31, 32 function by being compressed into the cavities 23, 33, 34, by up to 10 millimeters, under pressure from the different parts of the hand.

Figure 6:
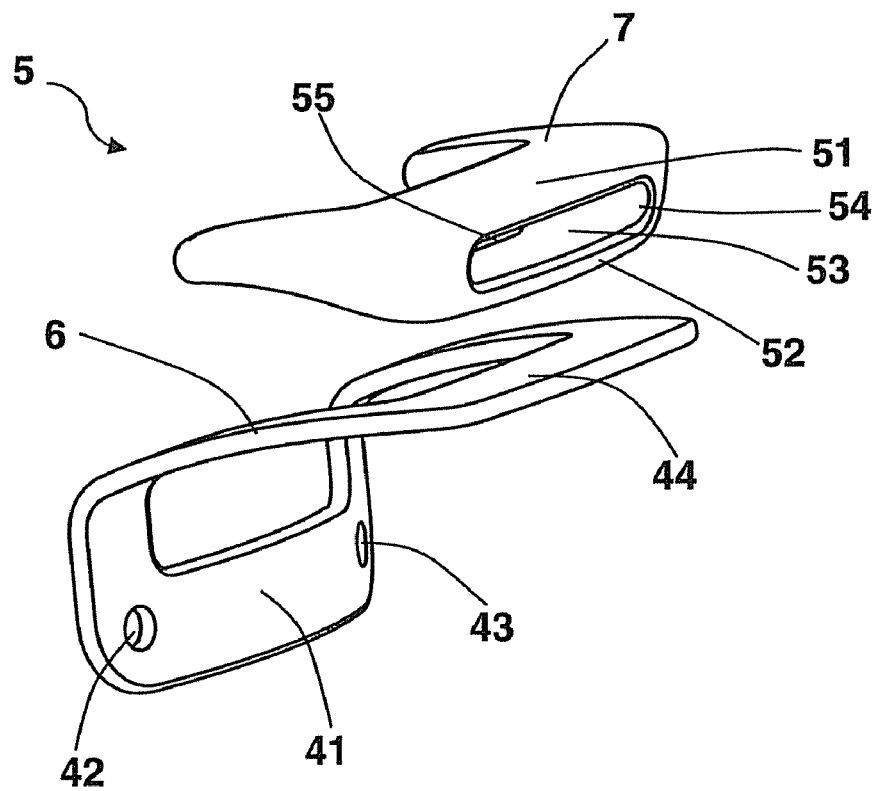
FIG. 6 depicts an exploded view, in perspective, of the handle in FIG. 5.

FIGS. 5 and 6 depict another method of implementing the invention, involving a handle 5 for a saucepan or stockpot. This type of cookware generally consists of a container equipped with two handles positioned diametrically opposite one another on the upper part of the outside of said container.

The handle 5 consists of a rigid structure 6 and a grip 7 surrounding the rigid structure 6.

The rigid structure 6 consists of a front part 41 designed to be placed against the container. The front part 41 has a means of being attached to the curve of the container, such as two openings 42, 43 that can accommodate two rivets.

The rigid structure 6 consists of a shaft 44 in a general U-shape with a cross section that is roughly rectangular in shape, extending perpendicular to the front part 41.

The grip 7 is cast molded onto the shaft 44 of the rigid structure 6. The grip 7 has a lower back part 51 that consists of a wall 52 positioned roughly horizontally facing the fingers of the user's hand, such as the middle and ring fingers, when the handle 5 is grasped.

A hollow cavity 53 is adjacent to the wall 52 and extends to enable said wall 52 to be compressed when the handle 5 is grasped. The cavity 53 exists in the material of the grip 7, between the wall 52 and the shaft 44 of the rigid structure 6, and it has two lateral openings 54, 55.

Of course, the scope of the invention is in no way limited to the methods of implementation described and illustrated, which were provided simply as examples. Modifications are possible, particularly regarding the makeup of the various components, or by substituting technical equivalents, while still remaining within the scope of the invention.

Thus, the cavity 23, 33, 34, 53 may contain flexible partitions that divided this cavity and thus modify the flexibility of the wall 22, 31, 32, 52.

The invention claimed is:

1. A cookware handle designed to be grasped by a user's hand, consisting of a rigid structure attached to the cookware, and a flexible grip surrounding the rigid structure having a front end, a back end, a top wall, a bottom wall and two lateral walls extending between said top wall and said bottom wall, wherein said rigid structure extends outward from said front end, characterized in that the flexible grip comprises:
   a front portion between the front end and the back end, wherein the bottom wall is between 2 and 10 mm thick and creates a hand support surface, and
   at least one hollow cavity inside the front portion of the grip, wherein said hollow cavity is disposed between said rigid structure and said bottom wall and extends to and between the lateral walls, in order to enable said bottom wall to be compressed when the handle is grasped.

2. The cookware handle described in claim 1, characterized in that the cavity is from 2 to 10 mm deep.

3. The cookware handle described in claim 1, characterized in that the cavity is open.

4. The cookware handle described in claim 1, characterized in that the grip is made by cast molding it onto the rigid structure.

5. The cookware handle described in claim 1, characterized in that the grip is made of a heat-resistant silicone material.

6. The cookware handle described in claim 1, characterized in that the Shore hardness of the grip is between 60 and 80 shores.

7. The cookware handle described in claim 1, characterized in that the grip has a back portion between the front portion and the back end comprising two hollow cavities extending between and to the top wall and the bottom wall.

* * * * *